(12) United States Patent
Mine

(10) Patent No.: US 6,253,342 B1
(45) Date of Patent: Jun. 26, 2001

(54) SEMICONDUCTOR INTEGRATED CIRCUIT

(75) Inventor: Kazumasa Mine, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/190,438

(22) Filed: Nov. 13, 1998

(30) Foreign Application Priority Data

Nov. 14, 1997 (JP) .................................................. 9-331213

(51) Int. Cl.[7] .................................................. G01R 31/28
(52) U.S. Cl. .................................................. 714/724
(58) Field of Search .................... 714/724; 712/32, 712/33

(56) References Cited

U.S. PATENT DOCUMENTS 5,724,603 * 3/1998 Nishiguchi ............................ 712/33
6,035,431 * 3/2000 Higashida ............................ 714/726

FOREIGN PATENT DOCUMENTS 60-258660 12/1985 (JP) .
3-58141 3/1991 (JP) .

* cited by examiner

Primary Examiner—Albert Decady
Assistant Examiner—Shelly A Chase
(74) Attorney, Agent, or Firm—Foley & Lardner

(57) ABSTRACT

Micro-computer capable of independently testing an additional logic for user and a pre-existing micro-computer portion in a shipment test of the micro-computer having the enclosed additional logic for user. A logic dedicated to connection is directly coupled to an internal bus of the micro-computer and is provided between the additional logic for user and the micro-computer. For testing the additional logic for user, a bus/port changeover terminal of the micro-computer and a read/write signal are used to effect readout/writing. Also, a bus inspection register is provided in the logic dedicated to connection. For testing the micro-computer, an output of the inspection register is read out to a bus of the logic dedicated to connection to inspect the bus.

13 Claims, 8 Drawing Sheets

FIG. 3

| FIRST TEST INPUT 9 | SECOND TEST INPUT 10 | MODE SETTING TERMINAL 32 | MODE SETTING TERMINAL 33 | MODE SETTING TERMINAL 34 | BUS/PORT CHANGEOVER TERMINAL 3 | OPERATING MODE (DETAILED MODE) | |
|---|---|---|---|---|---|---|---|
| | | PORT FUNCTION | | | | | |
| 0 | 0 | | | | | NORMAL OPERATION | (ONE-CHIP OPERATION) |
| 0 | 1 | READ STROBE OUTPUT | WRITE STROBE OUTPUT | ADDRESS STROBE OUTPUT | ADDRESS/DATA BUS INPUT/OUTPUT | | (EXTENSION TO OUTSIDE) |
| 1 | 0 | READ STROBE OUTPUT | WRITE STROBE OUTPUT | ADDRESS STROBE OUTPUT | ADDRESS/DATA BUS INPUT/OUTPUT | TEST FOR SHIPMENT | (TEST FOR PRE-EXISTING MICRO-COMPUTER) |
| 1 | 1 | READ STROBE INPUT | WRITE STROBE INPUT | ADDRESS STROBE INPUT | ADDRESS/DATA BUS INPUT/OUTPUT | | (TEST FOR ADDITIONAL LOGIC FOR USER) |

FIG. 4

| MODE SETTING TERMINAL 32 (RD) | 1 | 0 | 1 | 1 |
|---|---|---|---|---|
| MODE SETTING TERMINAL 33 (WR) | 1 | 1 | 0 | 1 |
| MODE SETTING TERMINAL 34 (ASTB) | 0 | 0 | 0 | 1 |
| BUS/PORT CHANGEOVER EXTERNAL TERMINAL 3 | HIGH IMPEDANCE | DATA OUTPUT | DATA INPUT | ADDRESS INPUT |
| BUS BUFFER 36 | OFF | OFF | ON | ON |
| BUS BUFFER 37 | OFF | ON | OFF | OFF |
| PORT LATCH 38 | THROUGH | THROUGH | THROUGH | THROUGH |
| CONTROL SIGNAL 39 | 1 | 1 | 1 | 1 |
| CONTROL SIGNAL 40 | 0 | 0 | 1 | 1 |
| CONTROL SIGNAL 41 | 0 | 1 | 0 | 0 |
| ADDRESS LATCH 46 | LATCH | LATCH | LATCH | THROUGH |
| BUS BUFFERS 47 | OFF | OFF | ON | OFF |
| BUS BUFFERS 48 | OFF | ON | OFF | OFF |
| CONTROL SIGNAL 51 | 0 | 0 | 0 | 1 |
| CONTROL SIGNAL 52 | 0 | 0 | 1 | 0 |
| CONTROL SIGNAL 53 | 0 | 1 | 0 | 0 |
| CONTROL SIGNAL 54 | 0 | 0 | 1 *1 | 0 |
| CONTROL SIGNAL 55 | 0 | 1 *1 | 0 | 0 |
| CONTROL SIGNAL 56 | 0 | 0 | 1 *2 | 0 |
| CONTROL SIGNAL 57 | 0 | 1 *2 | 0 | 0 |
| CONTROL SIGNAL 58 | 0 | 0 | 1 *1 | 0 |
| CONTROL SIGNAL 59 | 0 | 1 *1 | 0 | 0 |

*1···1 ONLY WHEN ADDRESS IS F800H TO F8FFH
*2···1 ONLY WHEN ADDRESS IS F855H OR F8AAH

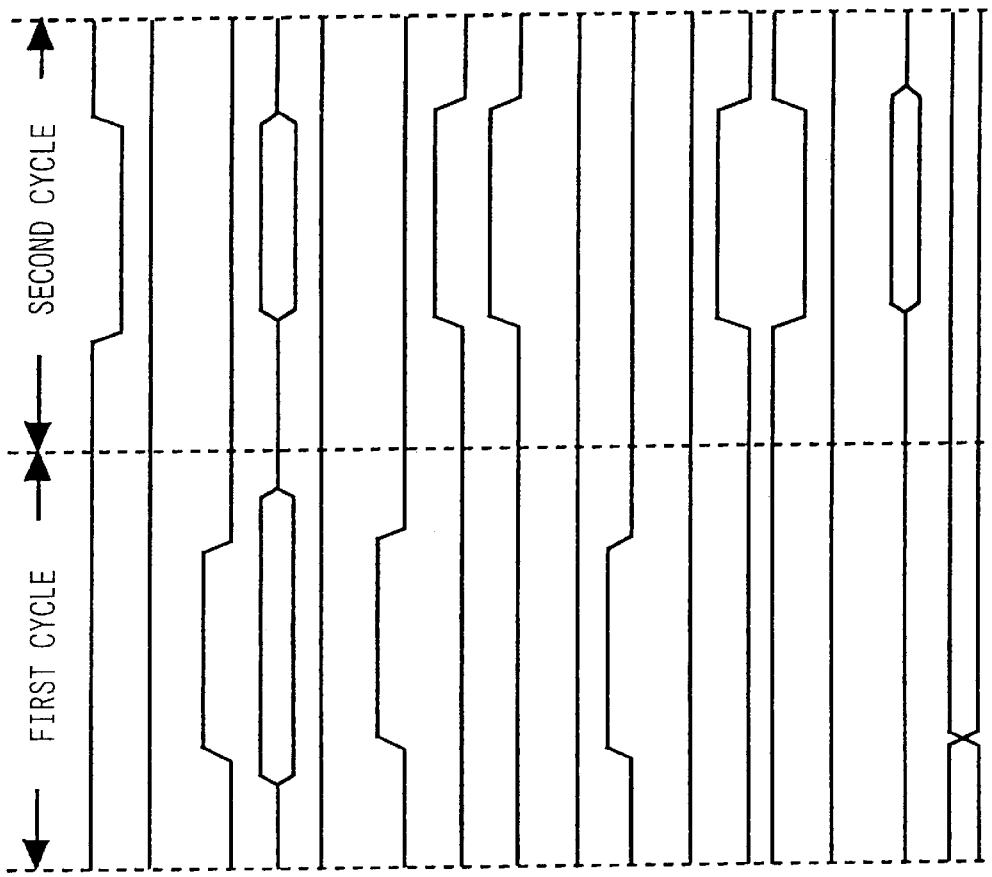

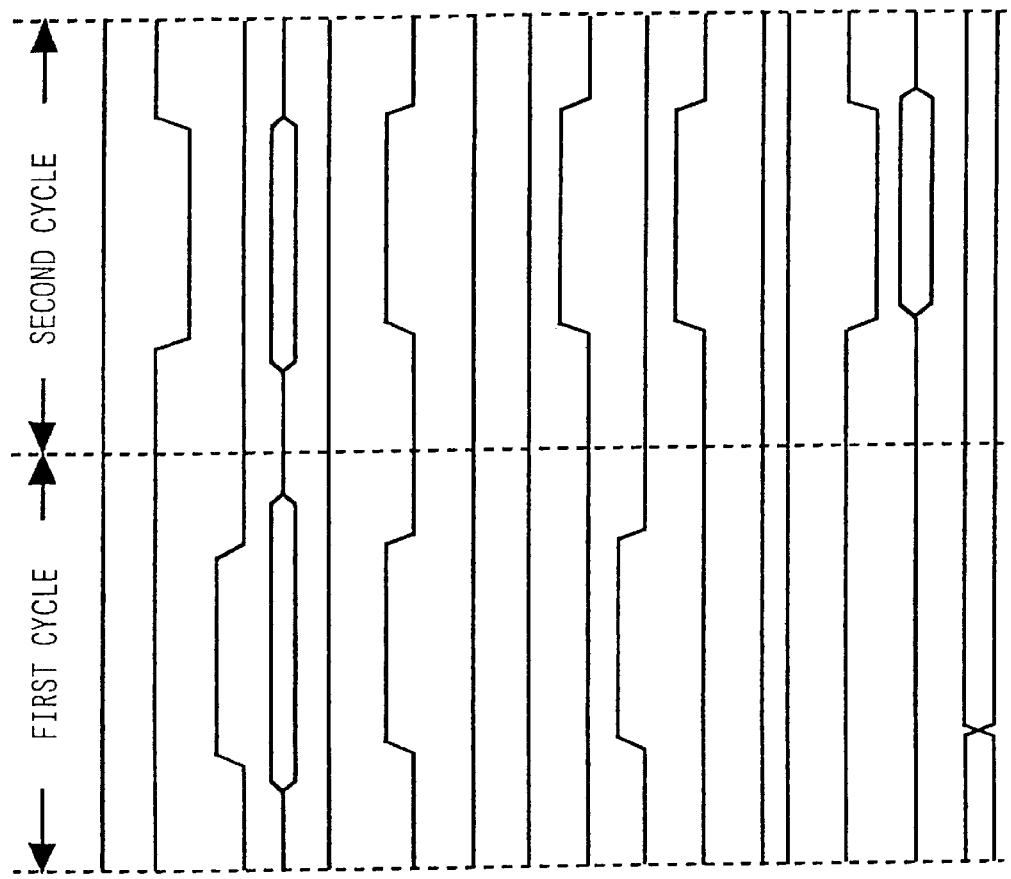

FIG. 8

| FIRST TEST INPUT 9 | SECOND TEST INPUT 10 | PORT/INSPECTION OUTPUT CHANGEOVER TERMINAL | INTERRUPT REQUEST SIGNAL 68 | OPERATING MODE |
|---|---|---|---|---|
| 0 | 0 | PORT FUNCTION | OUTPUT OF INTERRUPT REQUEST SINGNAL 69 OF ADDITIONAL LOGIC FOR USER | ONE-CHIP OPERATION |
| 0 | 1 | PORT FUNCTION | OUTPUT OF INTERRUPT REQUEST SINGNAL 69 OF ADDITIONAL LOGIC FOR USER | EXTENSION TO OUTSIDE |
| 1 | 0 | OUTPUT OF INSPECTION REGISTER 65 | OUTPUT OF INSPECTION REGISTER 65 | TEST FOR PRE-EXISTIONG MICRO-COMPUTER |
| 1 | 1 | OUTPUT OF INTERRUPT REQUEST SIGNAL 69 OF ADDITIONAL LOGIC FOR USER | OUTPUT OF INTERRUPT REQUEST SINGNAL 69 OF ADDITIONAL LOGIC FOR USER | TEST FOR ADDITIONAL LOGIC FOR USER |

SEMICONDUCTOR INTEGRATED CIRCUIT

FIELD OF THE INVENTION

This invention relates to a semiconductor integrated circuit having a micro-computer and a logic for a user. More particularly, it relates to an integrated circuit in which a new logic can be added to the micro-computer over a bus. The term 'logic' used herein denotes a 'logic unit' in general.

RELATED ART

If, in a conventional integrated circuit of this sort, a pre-existing micro-computer and an additional logic for a user are connected to each other, a logic dedicated for connection is provided between the micro-computer and an external bus of the additional logic for the user, one of the two being connected to an external bus/port changeover terminal of the micro-computer and the other being connected to an external bus of the additional logic for the user, as described in e.g., JP Patent Kokai JP-A-3-58141. For restoration of the port function of the micro-computer, lost by this connection, a port emulation function is accorded to the logic dedicated to the connection.

SUMMARY OF THE DISCLOSURE

However, the above-mentioned conventional technique suffers from the following disadvantages:

The first inconvenience is that, in the integrated circuit proposed in the JP Patent Kokai JP-A-3-58141, the chip in its entirety is increased in circuit scale thus obstructing reduction in size and cost.

The reason is that, since the logic dedicated to connection is provided as an extension on the outer side of the bus/port changeover terminal of the micro-computer, the port function is accorded to both the pre-existing micro-computer and the logic dedicated to the connection.

Specifically, as shown in FIG. 2 of the above-mentioned JP Patent Kokai JP-A-3-58141, showing an example of the dedicated logic, switch portions (SW12 and SW13 of FIG. 2 of the publication) and a latch (16 in FIG. 2 of the publication) are also enclosed in a bus/port changeover terminal (3 of FIG. 1 of the publication) provided in the computer of FIG. 1 of the publication, such that two circuits having the same function are provided in the same chip.

The second drawback is that, for inspecting all portions in a chip in an integrated circuit proposed in the above-mentioned JP Patent Kokai JP-A-3-58141, it is necessary to prepare a test pattern operating in the one-chip mode, that is under a state of controlling the additional logic for user using a CPU in the micro-computer.

The reason is that there exists a portion in the chip that cannot be operated in a mode other than in the one-chip mode. More specifically, a switch of the logic dedicated to connection used for interconnecting the micro-computer side bus and the bus of the additional logic for the user, namely a switch 11 of FIG. 2 of the JP Patent Kokai JP-A-3-58141, cannot be actuated if in a mode other than in the one-chip mode, such that it is necessary to prepare a dedicated test pattern.

The third drawback is that, if the integrated circuit shown in the second embodiment of the JP Patent Kokai JP-A-3-58141 is actuated in the additional logic test mode, a large number of external terminals of the chip is required.

The reason is that both an interrupt request signal output by the additional logic for the user and an interrupt request signal output by the additional logic for the user need to be input or output as external terminals of the chip.

It is therefore an object of the present invention to provide an integrated circuit of a reduced size and weight by eliminating from the logic dedicated to connection of the conventional integrated circuit the changeover switch or a port signal latch used for realizing the port emulation function to simplify the circuit to reduce the size and weight of the circuit.

It is another object of the present invention to provide an integrated circuit in which an operational test of the logic dedicated to connection, in which a large number of operational steps has been required in preparing a test pattern for operational testing, is facilitated to render it possible to improve productivity and reliability.

It is yet another object of the present invention to provide an integrated circuit in which the number of external terminals of a chip in a shipment test mode of the above-described conventional integrated circuit is decreased to render it possible to reduce the size and weight of the integrated circuit.

For accomplishing the above objects, the present invention provides, in one aspect, an integrated circuit having a micro-computer and an additional logic for the user in one semiconductor chip, including a logic dedicated to connection for interconnecting the micro-computer and the logic for the user, in which the micro-computer has a port circuit connected to an external terminal. The port circuit can input and output data to and from the outside of the chip via the external terminal, the port circuit being connected to a first bus provided in the inside of the micro-computer. The logic dedicated to connection is connected to the first bus provided in the micro-computer and to a second bus for connecting to the additional logic for user. Readout and writing from or to the additional logic for user is enabled via the terminal connected to the port circuit of the micro-computer.

In the integrated circuit of the present invention, the logic dedicated to connection for interconnecting the micro-computer and the additional logic for user has a bus inspection register for inspecting whether or not the second bus for connection to the additional logic for user is operating normally. The bus inspection register is constituted by a bit width which is the same as the data transfer width of the second bus. The bus inspection register is allocated to defined addresses for reading out and writing from or to the micro-computer, and optional data can be written in or read from the micro-computer via the first and second buses.

In the integrated circuit according to a third aspect of the present invention, the additional logic for user has an interrupt request signal to the micro-computer. The dedicated interfacing circuit for interconnecting the micro-computer and the additional logic for user has a circuit for transmitting an interrupt request output by the additional logic for user to the micro-computer and an interrupt request signal inspection register. The interrupt request signal inspection register has a number of bits corresponding to the number of interrupt request signals. An optional value is enabled to be written in each bit of the interrupt request signal inspection register from the micro-computer. There is provided a circuit for transmitting outputs of the respective bits in place of the interrupt request signals to the micro-computer.

The present invention also provided, in another aspect, a semiconductor integrated circuit having a micro-computer and an additional logic for user in one semiconductor chip, wherein a logic dedicated to connection directly connected to an internal bus of the micro-computer is provided between the additional logic for user and the micro-computer. During testing of the additional logic for user, the additional logic for user is freed from control by the CPU of the micro-computer, to make readout and writing from or to the additional logic for user via the internal bus and the logic dedicated to connection from outside using the bus/port changeover terminals of the micro-computer and the readout/writing control signal. Other features are disclosed in the dependent claims which are incorporated herein by reference thereto.

BRIEF DESCRIPTION OF THE DRAWINGS

FIG. 3 is a timing diagram showing the readout operation of the embodiment of the present invention.

FIG. 4 shows a truth table of the operating states of various portions of the embodiment of the present invention.

FIG. 5 is a timing diagram for illustrating the readout operation of the embodiment of the present invention.

FIG. 6 is a timing diagram for illustrating the readout operation of the embodiment of the present invention.

FIG. 8 shows the operating modes of the second embodiment of the present invention.

PREFERRED EMBODIMENTS OF THE INVENTION

Figure 1:
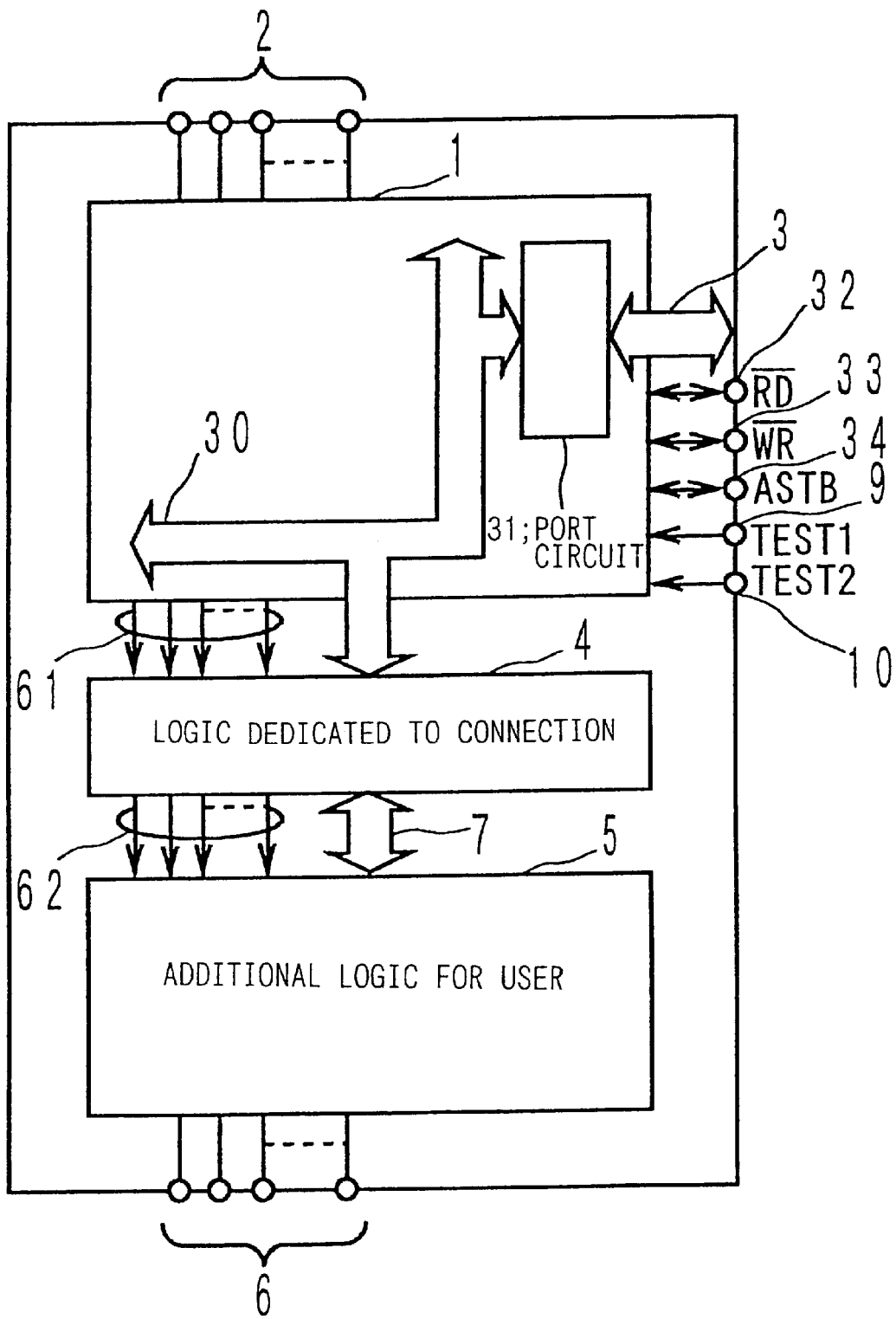
FIG. 1 is a block diagram showing an entire structure of an embodiment of the present invention.

A preferred embodiments of the present invention is hereinafter explained. In the preferred embodiment, the semiconductor integrated circuit according to the present invention realizes readout and writing from or to an additional logic for the user from outside the chip over an internal bus of the micro-computer without actuating the central processing unit. More specifically, the semiconductor integrated circuit includes a logic dedicated to connection (4 of FIG. 1) as means for directly interconnecting the additional logic for the user to the internal bus of the micro-computer (30 of FIG. 1) and a port circuit (31 of FIG. 1) as readout and write means from a bus/port changeover external terminal (3 of FIG. 1) as an external terminal of a chip to an internal bus of the micro-computer (30 of FIG. 1).

In its preferred embodiment, a switch portion interconnecting the internal bus of the micro-computer and the additional logic for the user is adapted to be tested easily. More specifically, a bus inspection register (50 of FIG. 2) as means for verifying the operation of a bus (7 of FIG. 2) connecting to the additional logic for the user (5 of FIG. 2) is provided in the inside of the logic dedicated to connection (4 of FIG. 2) of the additional logic for the user.

In a further embodiment of the present invention, there is provided a multiplexer (63 of FIG. 7) for the interrupt request signal and the port function of the micro-computer as a means for verifying the interrupt request signal (69 of FIG. 7) from the additional logic for the user (5 of FIG. 7) from outside during the test mode. There are also provided an inspection register (65 of FIG. 7) as a means for actuating the interrupt request input to the interrupt controller of the micro-computer and a multiplexer (71 of FIG. 7) for the interrupt request signal from the additional logic for the user and the output of the inspection register.

In the preset embodiment of the present invention, since the readout and writing from or to the additional logic for the user from outside the chip are made using an internal bus and a port circuit possessed by a usual micro-computer, there is no necessity of providing a port emulation function conventionally provided in the inside of the logic dedicated to connection.

Since the bus connected to the additional logic for the user can be tested from the micro-computer side by writing an optional value from the micro-computer to the bus inspection register 50, the bus changeover switch in the inside of the interface dedicated to connection can be tested by the same test pattern at all times without dependency upon the type of the additional logic for the user.

Also, during the shipment test mode since, the interrupt request signal from the additional logic for the user is output by multiplexing from the port function terminal of the micro-computer, and the interrupt request signal to the micro-computer is tested using the register for inspection, the number of the external terminals for the chip can be reduced to a value smaller than the conventional value.

FIG. 1 shows a block diagram showing an entire structure of an embodiment of the present invention. Referring to FIG. 1, the preset embodiment of the present invention includes a micro-computer 1, an additional logic for the user 5 and a logic dedicated to connection 4 interconnecting the micro-computer 1 and the additional logic for the user 5.

The micro-computer 1 has a bus/port changeover external terminal 3 and an internal bus 30. The logic dedicated to connection 4 is directly connected to the internal bus of the micro-computer 1. There are provided control signal groups 61, 62 for accessing the additional logic for the user 5 from the micro-computer 1 by way of data input/output.

In a present embodiment of the present invention, the integrated circuit has at least two operating modes, one of which is the 'normal operational mode', with the other being the 'additional logic for user test mode'. These modes are set e.g., via a test input terminal connected to outside the chip etc.

During the normal operating mode, the additional logic for the user 5 can be accessed only from the central processing unit 35 (FIG. 2) in the inside of the micro-computer 1. During this mode, the bus/port changeover external terminal 3 can be used as a bus for connecting to outside peripheral devices, e.g., a memory, not shown, or a peripheral chip, provided outside of the micro-computer 1, or otherwise as a port in case where no peripheral device such as chip is connected. During this mode, the internal bus 30 and the readout/write control signal groups 61, 62 are controlled by the central processing unit in the inside of the micro-computer 1.

During the additional logic for the user test mode, the additional logic for the user 5 is freed from control by the central processing unit within the micro-computer 1 so that it can be directly accessed from outside the chip via the bus/port changeover external terminal 3. At this time, the internal bus 30 also is freed from control by the central processing unit within the micro-computer 1.

For controlling the readout/writing from or to the additional logic for the user 5 from outside the chip, mode setting terminals 32 to 34 are used. The readout/write control signal groups (sets) 61, 62 are also controlled by the mode setting terminals 32 to 34 from outside the chip.

EMBODIMENTS

Reference is had to the drawings for illustrating a preferred embodiment of the present invention.

FIG. 1 shows the structure of an embodiment of the present invention. In FIG. 1, a micro-computer 1 is a single-chip micro-computer in which a central processing unit and a special function block are assembled into one chip.

The micro-computer 1 has a set of input/output terminals 2, a bus/port changeover external terminal 3, an internal bus 30, a port circuit 31, first and second input terminals 9, 10, mode setting terminals 32, 33, 34 and a set of control signals (signal lines) 61.

The set of control signals 61 is used for controlling the writing and readout from the micro-computer 1 to the logic dedicated to connection 4.

The logic dedicated to connection 4 is directly connected to the internal bus 30 for address/data of the micro-computer 1. The logic dedicated to connection 4 has a bus 7 for the micro-computer 1 to have access to the additional logic for the user 5 and a set of read-out and write control signal terminals (lines) 62.

The additional logic for the user 5 has the address/data bus 7, the set of read-out and write control signal terminals 62 and an input/output terminal to outside the chip 6.

Figure 2:
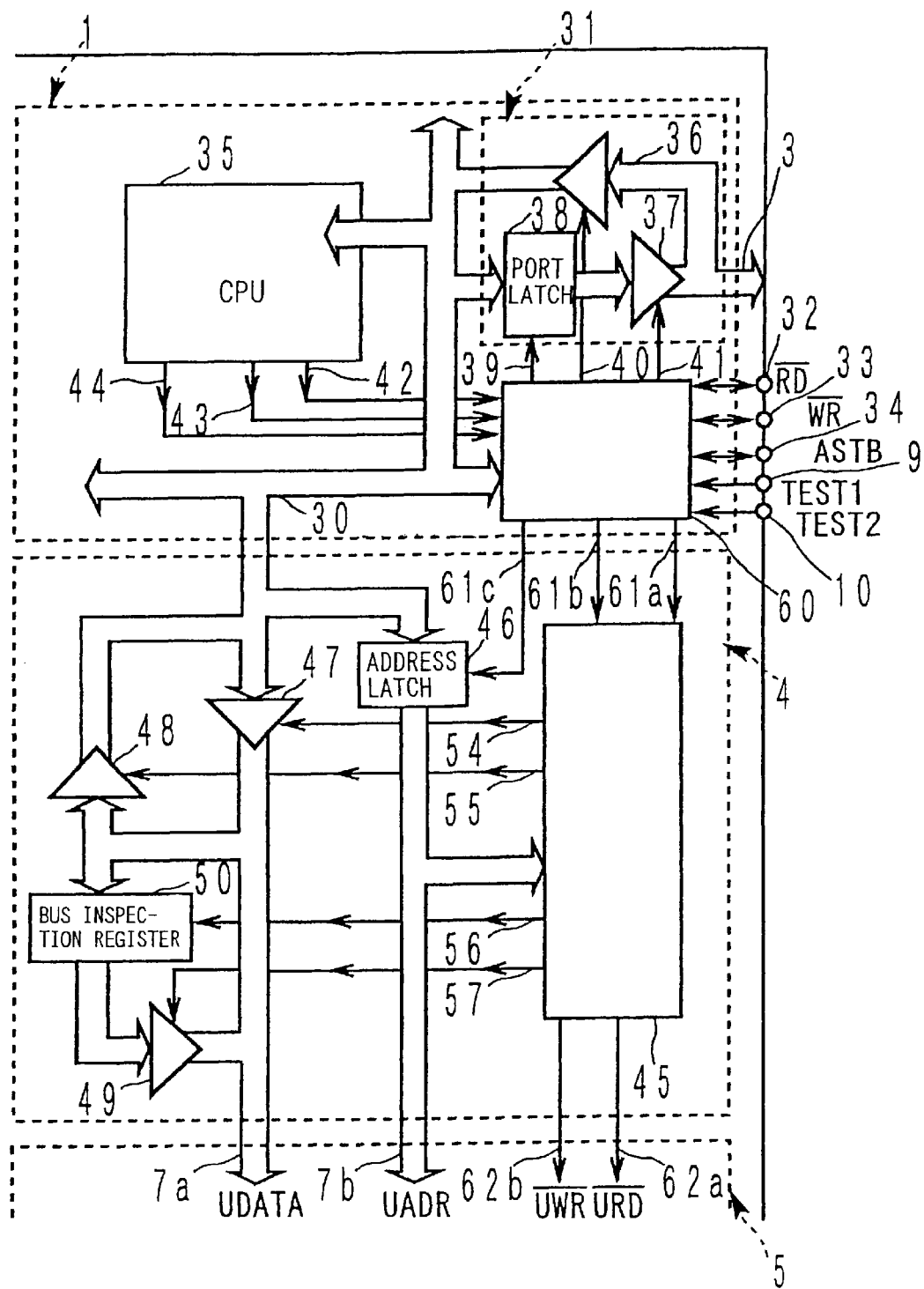
FIG. 2 is a block diagram showing a detailed structure of the embodiment of the present invention.

FIG. 2 is a block diagram showing a detailed structure of the micro-computer 1 and the logic dedicated to connection 4.

Referring to FIG. 2, the micro-computer 1 has a central processing unit 35, the internal bus 30, a port circuit 31 and an accessing control circuit 60. The internal bus 30 is connected to the central processing unit 35, port circuit 31, accessing control circuit 60 and to the logic dedicated to connection 4.

The logic dedicated to connection 4 is made up of a writing/readout control circuit 45, an address latch 46, bus buffers 47 to 49, and a bus inspection register 50.

In the integrated circuit of the preset embodiment, the internal bus 30 of the micro-computer 1 is of an address/data multiplexed type, while the bus of the additional logic for the user 5 is of the address/data separate type and is divided into a data bus 7a and an address bus 7b. Thus, the address latch 46 is provided in the inside of the logic dedicated to connection 4 for converting the multiplexed bus to the separate bus.

There is also provided a register for bus inspection 50 for improving the malfunction detection ratio on inspection of the logic dedicated to connection 4.

The operation of the preset embodiment is explained in detail.

In the preset embodiment, the operating mode of the micro-computer 1 is determined by the first and second test input terminals 9, 10. If the first test input terminal 9 is of the logic '0', the operating mode is set to 'normal operating mode', whereas, if the first test input terminal 9 is of the logic '1', the operating mode is set to 'test mode for shipment', as shown in FIG. 3.

The respective modes are set to more detailed modes by the second test input terminal 10. That is, the 'normal operating mode' is set to the 'one-chip operating mode', and to the 'external extension mode', while the 'test mode for shipment' is set to the 'pre-existing micro-computer test mode' and to the 'additional logic for user test mode'.

In the normal operating mode, the micro-computer 1 of the present embodiment starts retrieving a command from an enclosed ROM directly after resetting. On the other hand, in the pre-existing micro-computer test mode of the shipment test mode, a command starts to be retrieved from outside the chip directly after resetting. In the additional logic for user test mode, access can be had, that is data inputting/outputting is, enabled, from outside the chip.

During the normal operating mode and during the pre-existing micro-computer test mode, access can be had to, that is, data can be input or output to or from the additional logic for the user 5 only from the central processing unit 35 within the micro-computer 1. During the additional logic for user test mode, access can be had to the additional logic for the user 5 only from outside the integrated circuit.

During this mode, the internal bus 30 and the set of read-out and write control signals 61, 62 are controlled by the central processing unit 35 within the micro-computer 1.

Further, if the second test input terminal 10 is at the logical '1' during the normal operating mode, the single-chip micro-computer 1 operates in the external extension mode. That is, a bus/port changeover terminal 3 operates as a bus for connecting the memory or the peripheral chip to outside the micro-computer 1.

Conversely, if, during the normal operating mode, the second input terminal 10 is of the logical '0', the bus/port changeover external terminal 3 operates as a port.

During operation in the normal operation mode, readout and writing are possible via the internal bus 30 from the central processing unit 35 to the port circuit 31 and to the logic dedicated to connection 4.

The readout/write control circuit 60 in the micro-computer 1 transmits the values of control signals 42, 43, 44, output by the central processing unit 35, to control signal lines 61a, 61b, 61c, during the normal operation and during the pre-existing micro-computer test mode, while transmitting the values of mode terminals 32, 33, 34, as external terminals, to the control signal lines 61a, 61b, 61c during the additional logic for user test mode.

The readout/write control circuit 45 in the logic dedicated to connection 4 perpetually transmits the values of the control signals 61a, 61b to control signals 54, 55 used in the logic dedicated to connection 4, while transmitting the values of the control signals 61a, 61b to the control signals 62a, 62b entered to the logic dedicated to connection, independently of the operating mode.

The operation of readout and writing from or to the additional logic for user 5 during the normal operating mode and during the pre-existing micro-computer test mode is explained.

During these modes, the states of the control signals 42, 43, 44 are transmitted to the control signal lines 61a, 61b, 61c. On the other hand, port control signals 39, 40, 41 are controlled by the states of the internal register of a readout/write control circuit 60.

During the first cycle, an address output by the central processing unit 35 is transmitted over the internal bus 30. At this time, the control signal 44 (address strobe) output by the central processing unit 35 is activated. A readout/write control circuit 60 transmits the state of the control signal 44 to the control signal line 61c to transmit an address signal on the internal bus 30 to an address latch 46. When the control signal 44 is disactivated, an address signal is latched by the address latch 46. The address signal is transmitted over the address bus 7b to the additional logic for user 5.

During the second cycle, data is transmitted over internal bus 30. At this time, the control signal 42 (read strobe) and the control signal 43 (write strobe) are activated for signal readout and signal writing, respectively. The readout/write control circuit 60 in the micro-computer 1 transmits the state of the control signal 42, 43 to the control signal lines 61a, 61b, respectively.

The readout/write control circuit 45 in the logic dedicated to connection 4 transmits the state of the control signal 61b to the control signal lines 54, 62b, while transmitting the state of the control signal 61a to the control signal lines 55 and 62a. For readout, the control signal lines 54, 55 are disactivated and activated, respectively, with a bus buffer 47 not driving a data bus 7a and a bus buffer 48 driving the internal bus 30.

During writing, the control signal lines 54, 55 are activated and disactivated, respectively, with the bus buffer 47 driving the data bus 7a and the bus buffer 48 not driving the internal bus 30.

Thus, during readout, data output by the additional logic for user 5 is fed to the central processing unit 35 via data bus 7a, bus buffer 48 and internal bus 30, in this order.

During writing, data output by the central processing unit 35 is fed to the additional logic for user 5 via internal bus 30, bus buffer 47 and data bus 7a in this order.

The above is the explanation of the readout or write operation from or to the additional logic for user 5 during the normal operating mode.

The readout and writing operations from outside the chip to the additional logic for user 5 during the additional logic for user test mode is explained. FIG. 4 shows a truth table of the operating states of various portions.

During the time the chip is operating in the additional logic for user test mode, readout/write is possible from the port circuit 31 to the logic dedicated to connection 4 over internal bus 30. The readout/write operation is controlled by the readout/write control circuit 60 of the micro-computer 1.

During this mode, the states of the mode terminals 32, 33, 34 are transmitted to the control signal lines 61a, 61b, 61c, respectively. It is noted that port control signals 39, 40, 41 are controlled by the combination of the mode terminals 32, 33, 34.

FIGS. 5 and 6 show a readout operation timing chart and a write operation timing chart for this mode, respectively.

During the first cycle, an address entered from the bus/port changeover terminal 3 is transferred via internal bus 30 to the address bus 7b. At this time, the mode setting terminal 34 (address strobe) is activated, while the mode setting terminal 32 (read strobe) and the mode setting terminal 33 (write strobe) are disactivated.

The readout/write control circuit 60 transmits the state of the mode setting terminal 34 to the control signal lines 40 and 61c, while transmitting the the state of the mode setting terminal 32 to the control signal lines 41 and 61a, with a bus buffer 36 driving the internal bus 30 and with a bus buffer 37 not driving the bus/port changeover external terminal 3.

Thus, the address signal sent from the bus/port changeover external terminal is transmitted over internal bus 30 to the address latch 46. When the control signal 34 is disactivated, the address signal is latched by the address latch 46. The address signal is transmitted over address bus 7b to the additional logic for user 5.

During the second cycle, data is transmitted over the internal bus 30. At this time, the mode setting terminal 34 (address strobe) is disactivated. For readout, if the mode setting terminal 32 (read strobe) is activated, the readout/write control circuit 60 in the micro-computer 1 transmits the state of the mode setting terminal 32 to the control signal lines 39, 41 and 61a, with the port latch 38 being in the data-through state, and with the bus buffers 37 and 36 being in the driving and in the non-driving states, respectively.

In the case of writing, if the mode setting terminal 33 (write strobe) is activated, the readout/write control circuit 60 in the micro-computer 1 transmits the state of the mode setting terminal 33 to the control signal lines 40, 61b, with the bus buffers 36, 37 being in the driving and non-driving states, respectively.

The readout/write control circuit 45 in the logic dedicated to connection 4 transmits the state of the control signal 61b to the control signal lines 54, 62b, while transmitting the state of the control signal 61a to the control signal lines 55 and 62a, respectively. In the case of readout, the control signals 54, 55 are disactivated and activated, respectively, with the bus buffer 47 not driving the data bus 7a and with the bus buffer 48 driving the internal bus 30.

In case of writing, the control signal 54 is activated, while the control signal 55 is disactivated, with the bus buffer 47 driving the data bus 7a and the bus buffer 48 not driving the internal bus 30.

Therefore, in readout, data output by the additional logic for user 5 is sequentially passed through the data bus 7a, bus buffer 48, internal bus 30, port latch 38 and through the bus buffer 37 so as to be output at the bus/port changeover external terminal 3.

In writing, data entering the bus/port changeover external terminal 3 is sequentially passed through the bus buffer 36, internal bus 30, bus buffer 47 and the data bus 7a so as to be input to the additional logic for user 5.

The foregoing is the explanation of readout or writing from or on the additional logic for user 5 during the additional logic for user test mode.

An embodiment of the buss inspection register for confirming the operation of a bus connected to the additional logic for user according to the present invention is explained.

Referring to FIG. 2, the register for bus inspection 50 has its input connected to the data bus 7a connecting to the additional logic for user 5, while having its output connected to the data bus 7a via bus buffer 49.

A write control signal 56 for the register for bus inspection 50 and a drive control signal 57 of the bus buffer 49 are generated by the readout/write control circuit 45 within the logic dedicated to connection 4. The readout/write addresses of the bus inspection register 50 are allocated by the control circuit 45. The address allocation is made so that stuck-at-0 fault or stuck-at-1 fault of the respective bits of the bus can be detected, such that, if the address is of 8 bits, accessing can be had from both 55 and AA of the hexadecimal notation.

The control signals 56, 57 are generated by logical products of the outputs of the control signals 61a, 61b and outputs of the address decoder in the inside of the control circuit 45, respectively.

The sequence of inspecting the malfunction using the register for bus inspection 50 is hereinafter explained.

If, for example, the register for bus inspection 50 has a data width of 8 bits, and addresses are redundantly allocated to 55 hexadecimal and AA hexadecimal, the following procedure is followed: First, data 55 hexadecimal is written in the address 55 hexadecimal. The address AA hexadecimal is then read out in order to verify that the data is 55 hexadecimal. Second, data AA hexadecimal is written in the address AA hexadecimal in order to verify that the data is AA hexadecimal.

The above operation can detect stuck-at-0 fault and the stuck-at-1 fault of each bit of the data bus 7a and the address bus.

Figure 7:
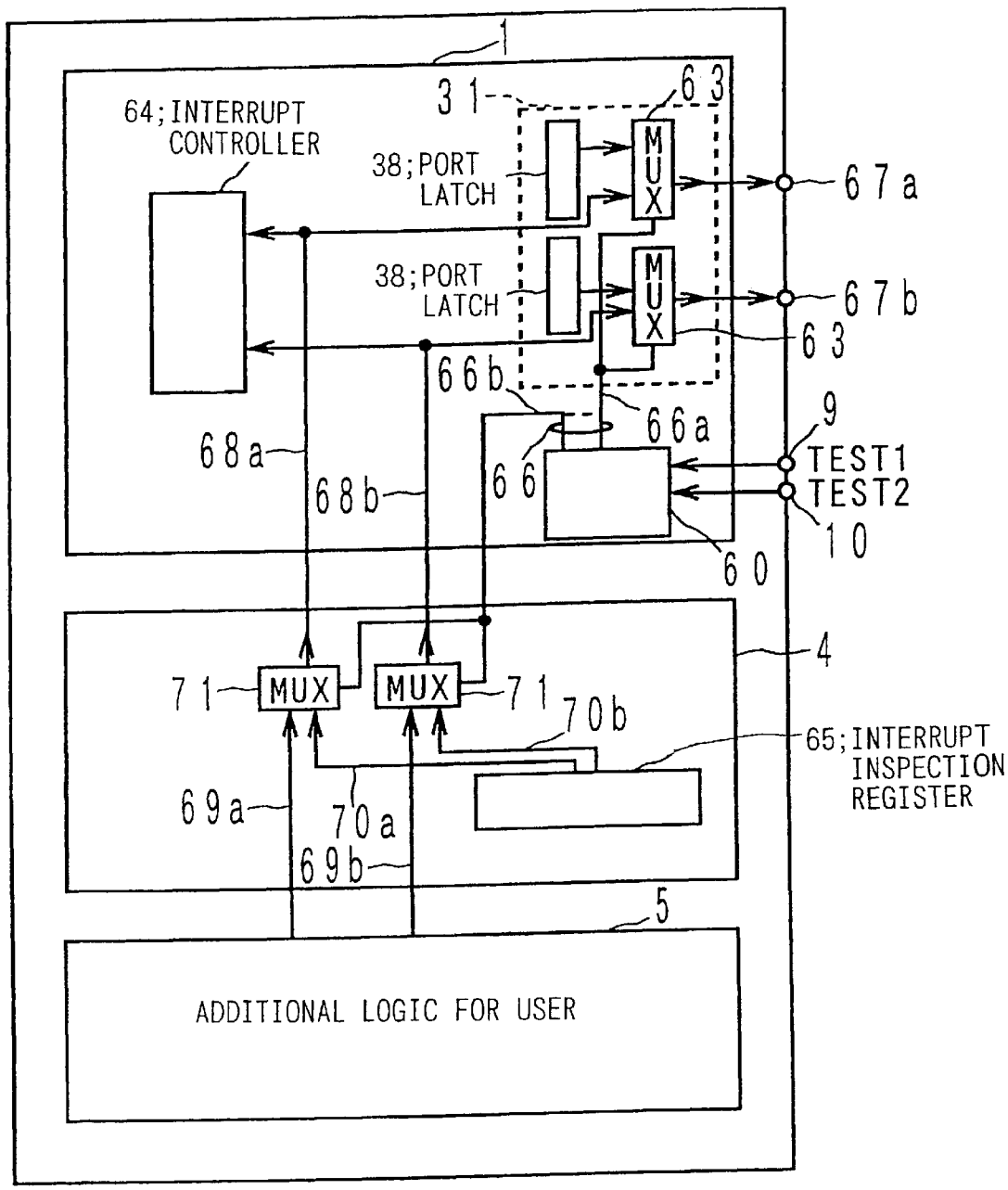
FIG. 7 is a block diagram showing the structure of a second embodiment of the present invention.

Referring to FIGS. 7 and 8, an embodiment in which an interrupt signal is being output from the additional logic for user 5 to the central processing unit 35. Although only portions needed for explanation of interrupt are shown in FIG. 7, the bus structure or the like structure are the same as that shown in FIGS. 1 and 2. FIG. 8 shows a table of the operational modes of the present embodiment.

Referring to FIG. 7, an interrupt request output 69 is connected via the logic dedicated to connection 4 to the micro-computer 1. An interrupt request signal 69 (69a, 69b) and an inspection signal 70 (70a, 70b) output by the interrupt inspection register 65 are selected by a multiplexer 71 and transmitted to an interrupt request input 68 (68a, 68b). The interrupt request input 68 is fed to an interrupt controller 64 in the micro-computer 1, at the same time it is fed to the port circuit 31 in the micro-computer 1. In the inside of the port circuit 31, the interrupt request input 68 (68a, 68b) and an output of the port latch 38 are selected by a multiplexer 63; 63 and thence transmitted to the input/output terminal 67 (67a, 67b).

Which of the two signals is selected by the multiplexer 71 in the logic dedicated to connection 4 and which of the two signals is selected by the multiplexer 63 in the port circuit 31 are determined by control signals output by the readout/write control circuit 60.

The multiplexer 63 in the port circuit 31 selects the interrupt request input 68 and the output of the port latch 38 for the additional logic for user test mode shown in FIG. 8 and for other modes, respectively. The multiplexer 71 in the inside of the logic dedicated to connection 4 selects the output 70 of the interrupt inspection register 65 and an interrupt request output 69 output from the additional logic for user for the pre-existing micro-computer test mode and for other modes, respectively.

The interrupt inspection register 65 is connected to the data bus 7a and can read/write from or to the central processing unit 35 as in the case of the register for bus inspection (50 in FIG. 2).

The inspection procedure of an interrupt request output signal 69 and the interrupt request input signal 68 are explained.

For inspecting the interrupt request output signal 69, the integrated circuit is set for the additional logic for user test mode by first and second test input terminals 9, 10.

The additional logic for user 5 is accessed from outside the integrated circuit and actuated to generate an interrupt request. The activated interrupt request signal 69 is output via multiplexer 71, interrupt request input 68, multiplexer 63 and input/output terminal 67 to outside the integrated circuit, so that it is detected.

For inspecting the interrupt request input signal, the integrated circuit is set by the test input terminals 9, 10 to the pre-existing micro-computer test mode. If the corresponding bit of the interrupt inspection register 65 is set by the central processing unit 35, the bit as set by the multiplexer 71 is selected to activate the interrupt request input 68. The generated interrupt request signal is transmitted to the interrupt request register in the interrupt controller to set the corresponding bit of the interrupt request register in the interrupt controller, so that it is read out by the central processing unit 35 and the read-out state is entered to the set of input/output terminals 2 for detection.

As described above, the present invention gives the following meritorious effects:

The first effect of the present invention is that the area of the integrated circuit can be reduced to realize small size and light weight.

The reason is that, in the present invention, the port emulation function is removed from the logic dedicated to connection to simplify to reduce the chip area of the integrated circuit.

The second effect of the present invention is that the integrated circuit can be improved in reliability.

This is because, in the present invention, the register for bus inspection is provided in the logic dedicated to connection to render possible inspection of the switch unit interconnecting the internal bus in the micro-computer and the bus of the additional logic for user.

The third effect of the present invention is that the number of terminals of the integrated circuit can be reduced to improve its reliability.

The reason is that, in the present invention, the inspection output of the interrupt request signal output from the additional logic for user is used simultaneously with the port function of the micro-computer and an input to the interrupt controller to the micro-computer of the request signal is used as an output of the inspection register rather than that of the output terminal to reduce the number of the output terminals, while the inspection register for the interrupt request signal is provided to facilitate the inspection of the interrupt controller.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. An integrated circuit having a micro-computer and an additional user logic in one semiconductor chip, comprising:

a logic circuit dedicated for interconnecting the micro-computer and the additional user logic;

said micro-computer having a port circuit connected to an external terminal;

said port circuit being capable of inputting and outputting data to and from the outside of the chip via said external terminal, said port circuit being connected to a first bus provided in said micro-computer;

said logic being connected to said first bus provided in said micro-computer and to a second bus for connecting to said additional user logic;

readout and writing from or to the additional user logic being enabled via the external terminal connected to said port circuit of the micro-computer.

2. The integrated circuit as defined in claim 1 wherein said logic circuit has a bus inspection register for inspecting whether or not the second bus for connection to said additional user logic is operating normally;

wherein said bus inspection register is constituted by a bit width which is the same as the data transfer width of said second bus, said bus inspection register being allocated to defined addresses for reading out and writing from or to the micro-computer, and wherein optional data can be written in or read from the micro-computer via said first and second buses.

3. The integrated circuit as defined in claim 2, wherein said additional user logic has a signal line for an interrupt request signal to said microcomputer;

wherein the logic circuit has a circuit for transmitting an interrupt request output by said additional user logic to said micro-computer and an interrupt request signal inspection register;

said interrupt request signal inspection register having a number of bits corresponding to the number of interrupt request signals;

an optional value being enabled to be written in each bit of said interrupt request signal inspection register from said micro-computer; and a circuit for transmitting outputs of said respective bits in place of said interrupt request signals to said micro-computer.

4. The integrated circuit as defined in claim 1, wherein said additional user logic has a signal line for an interrupt request signal to said microcomputer;

wherein the logic circuit has an interrupt request signal inspection register and a circuit for transmitting an interrupt request output by said additional user logic to said micro-computer;

said interrupt request signal inspection register having a number of bits corresponding to the number of interrupt request signals;

an optional value being enabled to be written in each bit of said interrupt request signal inspection register from said micro-computer; and a circuit for transmitting outputs of said respective bits in place of said interrupt request signals to said micro-computer.

5. The semiconductor integrated circuit as defined in claim 4, wherein output of said interrupt request signal inspection register and output of said additional user logic are supplied to a multiplexer which combines both the outputs and supplies an output of an interrupt request signal to an interrupt controller in said micro-computer, said interrupt request signal being also supplied to said port circuit.

6. The semiconductor integrated circuit as defined in claim 5, wherein said port circuit comprises a port/inspection switching terminal, as an external terminal which is connected to the first bus via a multiplexer which combines a port latch and said interrupt request signal, said multiplexer being controlled by the readout/writing control circuit.

7. The semiconductor integrated circuit as defined in claim 1, wherein the second bus is made up of a data bus and an address bus;

wherein said data bus has a bus inspection register for inspecting whether or not the second bus is operating normally, said data bus being connected to the first bus via a readout/writing changeover circuit, wherein said address bus is connected to the first bus via an address latch circuit.

8. The semiconductor integrated circuit as defined in claim 7, wherein the bus inspection register is controlled by a readout/writing controller which is actuatable via external terminals other than the external terminal connected to said port circuit.

9. The semiconductor integrated circuit as defined in claim 8, wherein said readout/writing changeover circuit comprises a parallel circuit of bus buffers which are controlled by said readout/writing controller.

10. The semiconductor integrated circuit as defined in claim 1, wherein at least two test modes are applicable using a plurality of test terminals, a first test mode being directed to the micro-computer while a second test mode being directed to the additional user logic.

11. The semiconductor integrated circuit as defined in claim 1, wherein at least four modes of operation is selectable via two test terminals, a first mode being a normal operation which is further selectable to one-chip-operation or extension-to-outside-operation, while a second mode being a testing operation which is further selectable to testing of the existing micro-computer or testing of the additional user logic.

12. A semiconductor integrated circuit having a micro-computer which includes a CPU, and an additional user logic in one semiconductor chip, said circuit comprising:

a logic circuit directly connected to an internal bus of the micro-computer and interconnected between the additional user logic and the micro-computer; and wherein during a testing of the additional user logic, the additional user logic is freed from control by the CPU of the micro-computer, to make readout and writing from or to said additional user logic via said internal bus and said logic circuit from outside using bus/port changeover terminals of the micro-computer and readout/writing control signals.

13. The semiconductor integrated circuit as defined in claim 12, wherein a bus inspection register is provided in said logic circuit for inspecting a bus in said logic circuit, said bus being connected to said additional user logic, and wherein the bus is inspected during testing of said micro-computer by reading an output of said inspection register to said bus of said logic circuit.

* * * * *